United States Patent
Wiesinger

(10) Patent No.: US 8,079,516 B2
(45) Date of Patent: Dec. 20, 2011

(54) METHOD FOR TRACKING A SALES CHANNEL OF A MERCHANDISE ITEM

(75) Inventor: Bernhard Wiesinger, Salzburg (AT)

(73) Assignee: SONY DADC Austria AG, Anif (AT)

( * ) Notice: Subject to any disclaimer, the term of this patent is extended or adjusted under 35 U.S.C. 154(b) by 830 days.

(21) Appl. No.: 12/055,729

(22) Filed: Mar. 26, 2008

(65) Prior Publication Data

US 2009/0242630 A1    Oct. 1, 2009

(51) Int. Cl.
*G06K 5/00* (2006.01)
(52) U.S. Cl. ......... 235/385; 235/380
(58) Field of Classification Search .......... 235/385, 235/380, 383, 462.02, 462.46
See application file for complete search history.

(56) References Cited

U.S. PATENT DOCUMENTS

| 6,327,576 B1* | 12/2001 | Ogasawara ............ 705/22 |
| 6,886,748 B1* | 5/2005 | Moore ............ 235/435 |
| 2002/0046093 A1* | 4/2002 | Miller et al. ............ 705/14 |

* cited by examiner

*Primary Examiner* — Daniel St.Cyr
(74) *Attorney, Agent, or Firm* — Oblon, Spivak, McClelland, Maier & Neustadt, L.L.P.

(57) ABSTRACT

Method for tracking a sales channel of a merchandise item, comprising: storing an item identifier of said merchandise item on a data carrier; storing in a data base said item identifier together with an associated sales channel identifier; selling said merchandise item together with said data carrier to a customer; reading at a customer's location said item identifier from said data carrier; transmitting said item identifier together with a location identifier to said registration data base; identifying said item identifier in said data base; and comparing said location identifier with said associated sales channel identifier.

14 Claims, 5 Drawing Sheets

METHOD FOR TRACKING A SALES CHANNEL OF A MERCHANDISE ITEM

An embodiment of the invention relates to a method for tracking a sales channel of a merchandise item. A further embodiment relates to a system for tracking a sales channel of a merchandise item.

BACKGROUND

Manufacturers or vendors of merchandise items, e.g. electronic devices, like TV sets, computers, game consoles, or books, compact discs (CDs), digital versatile discs (DVDs), or even clothes are often interested in tracking the sales channel, i.e. the different persons or companies and their location, which have been in contact with the merchandise item on their way from the manufacturer or vendor to the final customer.

It is an object of the invention to improve the manufacturer's or vendor's knowledge of the sales channel to the customer.

The object is solved by methods and a system according to claims 1, 6, 8, 10, and 14.

Further embodiments are defined in the dependent claims.

Further details of the invention will become apparent from a consideration of the drawings and ensuing description.

DETAILED DESCRIPTION

In the following, embodiments of the invention are described. It is important to note, that all described embodiments in the following may be combined in any way, i.e. there is no limitation that certain described embodiments may not be combined with others.

Figure 1:
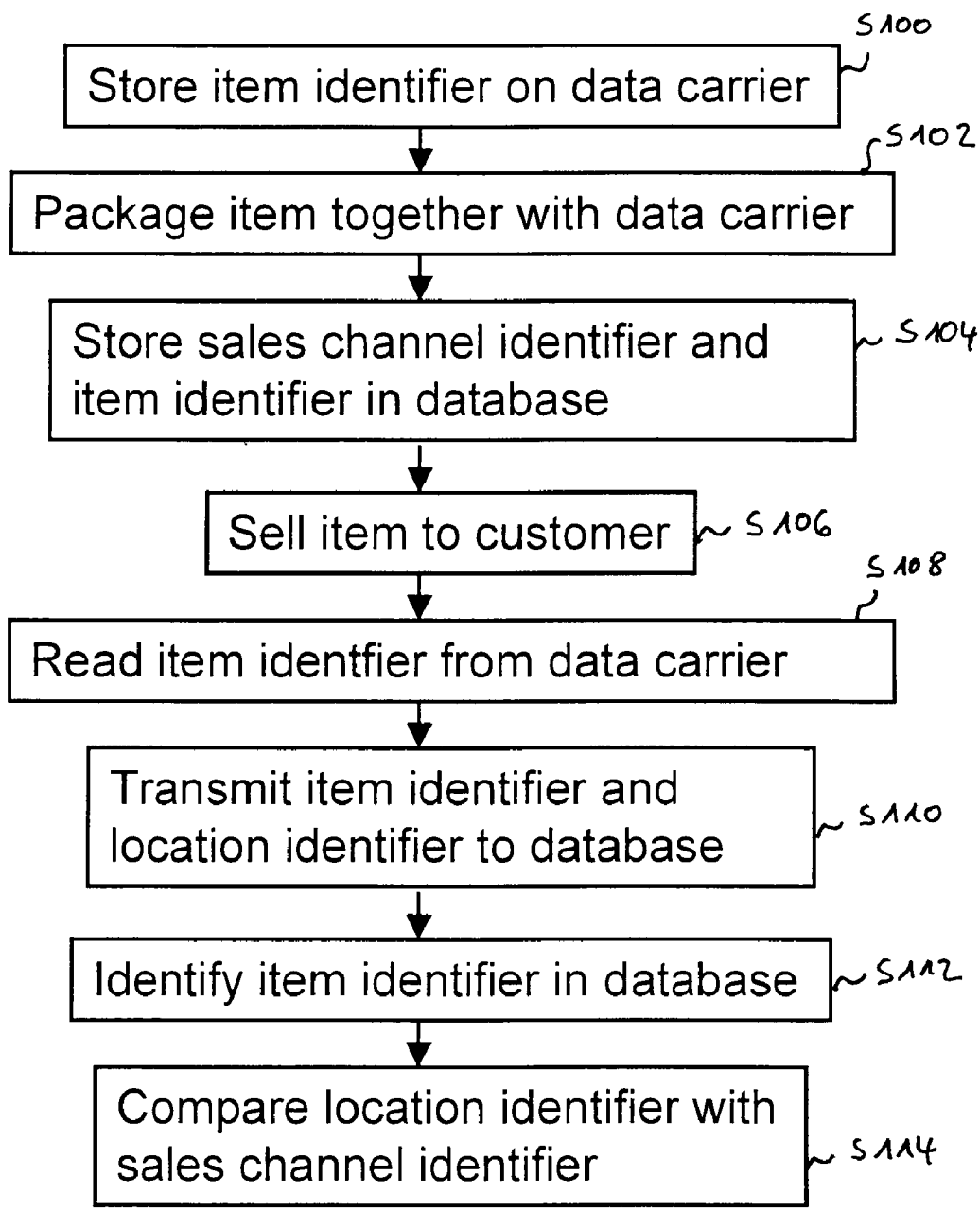
FIG. 1 shows main steps of one embodiment of the invention.

In FIG. 1 in step S100 an item identifier is stored on a data carrier. Such data carrier might be a compact disc (CD), a digital versatile disc (DVD) or a semiconductor memory device. The item identifier identifies an individual merchandise item, e.g. the item identifier may correspond to a serial number of the merchandise item. Manufacturers of e.g. TV sets as merchandise item may provide a serial number for every individual TV set, in order to identify said individual TV set among the plurality of TV sets that have been manufactured, e.g. for purposes of error tracking during manufacturing or for an easier finding of correct spare parts in case of a later failure of the TV set or for an improved service for customers, who bought the corresponding TV set.

A possibility of storing the item identifier on a CD or DVD is to use the so-called post-scribed-ID, which is disclosed e.g. in US2004/0006607. This post-scribed ID is a unique disc identification information, which is post-scribed for each disc by an additional ID write process, after the production of the CD with its content, e.g. a collection of songs. So each CD having the same content additionally comprises an individual unique ID, which can be used to identify a single CD from a plurality of CDs with the same content. In the present embodiment the content on the data carrier may be a user manual for the merchandise item.

The merchandise item and the data carrier are packaged together in step S102. Whether the item identifier of the merchandise item corresponds to the item identifier on the data carrier can be additionally checked during this packaging step, e.g. when the item identifier is printed additionally as a bar code on the data carrier, so that a bar code reader can check the item identifier, when packaging the merchandise item with the data carrier.

In step S104 the item identifier is stored together with an associated sales channel identifier in a database. Such sales channels may be among others: different online shops, different retailers, different intermediate vendors. A corresponding sales channel identifier identifies each different sales channel, which can be used for selling the merchandise item.

In step S106 the merchandise item is sold together with the data carrier to a customer. The customer might take the merchandise item to a customer's location, e.g. his home, his office, his car or his secondary residence.

In step S108 the item identifier is read at the customer's location. Therefore, the customer may insert the data carrier in a data carrier reading device. In step S110 the item identifier is transmitted together with a location identifier to the database. Such transmission might be performed by connecting said data carrier reading device, e.g. a computer with a CD or DVD drive to the internet and transmitting said item identifier through the internet to the database, which internet address might be stored additionally on the CD or DVD, so that the customer only needs to insert the CD or DVD into the disk drive and automatically will get connected to the database without inputting complex internet addresses. The location identifier might be the actual internet address of the computer, which is used for reading out the item identifier or might be some other identification of the location, where the customer is actually using the sold merchandise item, e.g. a position of a mobile computer device determined by a Global Positioning System (GPS) within such mobile computer device. The location identifier might be as well the name and/or the address of the customer which may be read from other databases of the computer, e.g. personalization data of the customer.

In step S112 the transmitted item identifier is identified within the database, so that the associated sales channel identifier can be read out of the database. This associated sales channel identifier is compared to the location identifier in step S114. With this comparison the sales channel of the merchandise item is tracked. "Tracking" the sales channel may also be understood as "observing", "tracing", "monitoring" or "following" the sales channel.

In an embodiment the associated sales channel identifier is descriptive of the sales channel through which the item is intended to be sold. After receiving the location identifier it is possible to determine a trust value during the comparison of the location identifier with the associated sales channel identifier, said trust value being descriptive of a probability of having actually used said sales channel for selling the merchandise item to the customer.

For instance, the location identifier might be an Internet address traced to Sweden, whereas the intended sales channel has been a retailer with shops only in the United States. It might be evident that a single occurrence of such a case might not be regarded as relevant, e.g. one tourist from Sweden might have bought the merchandise item in a shop in the U.S., However, it will become evident that something is "wrong" with the sales channel, if a large number of merchandise items or even all merchandise items would appear to be sold to Swedish customers. Possible alternatives in this case would be either to adjust the sales channel identifier accordingly or to investigate together with the retailer, how such a large number of merchandise items have been found in Sweden. Even a theft in a store of the retailer or during transport might have been occurred.

Also a large distribution of locations, what e.g. might be expected for an online shop as sales channel, might be difficult to explain for an intermediate vendor, who promised to sell the merchandise items for a reduced price to e.g. children. Confronted with this evidence the manufacturer can decide whether he can trust the intermediate vendor or not.

It is also possible to identify the sales channels, which are most useful to sell the merchandise items, simply by counting the item identifiers, which have been received and have been stored together with said sales channel identifier in the database. Thus, it may be possible to optimize sales channels by evaluating through which sales channels the most items have been sold.

In a further embodiment additional information data of the sales channel is stored in the database. Such additional information data can be sent to the customer's location identified by said location identifier. For instance, the additional information might be presented on a web page, which is accessible for a customer after having inserted the CD or DVD into the disk drive of his computer, which is connected to the Internet.

In a further embodiment this additional information may be advertising data of the sales channel, so that e.g. additional advertisement of the sales channel, e.g. an online shop or a retailer might be presented easily to the customer.

In a further embodiment said location identifier may be used to register the customer as a legitimate buyer in the database to offer additional assistance in case of failures or updates for the merchandise item.

Figure 2:
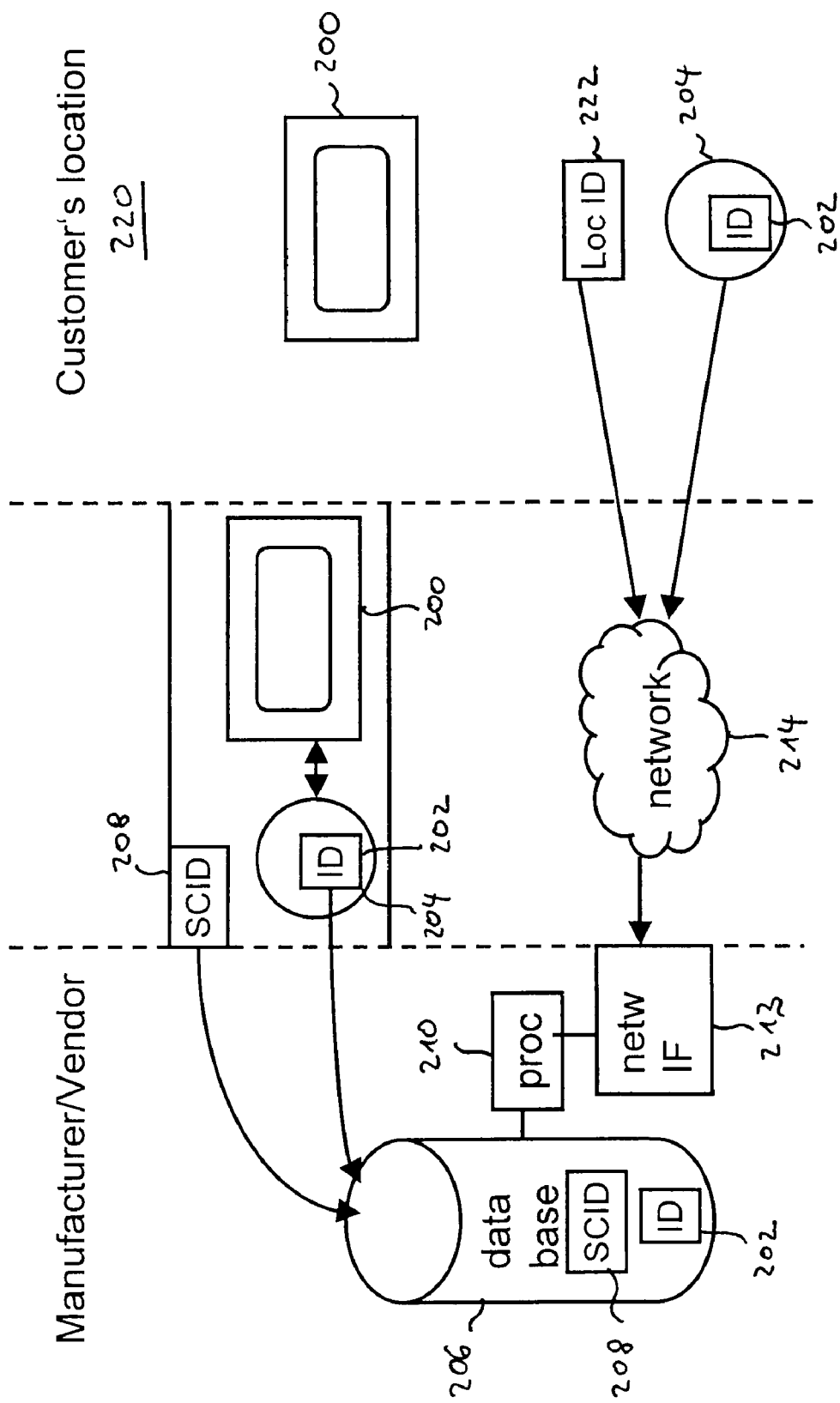
FIG. 2 shows a system according to an embodiment of the invention.

A system according to a further embodiment of the invention is depicted in FIG. 2. A merchandise item 200, e,g, a TV set, is intended to be sold by a manufacturer. The serial number or a corresponding identification of the merchandise item is stored as an item identifier 202 on a data carrier, e.g. a CD-ROM 204. The system comprises a database 206, in which the item identifier 204 is stored together with the associated sales channel identifier 208. The database 206 is connected via a processor 210 and a network interface 212 to a network 214, e.g. the Internet.

At a customer's location 220, the item identifier 202 is read from the data carrier 204 and transmitted together with a location identifier 222 via the network 214 and the network interface 212 to the processor 210. The processor 210 is configured to identify the transmitted item identifier in the database 206 and find the associated sales channel identifier 208. The associated sales channel identifier is compared within the processor 210 with the received location identifier 222.

Figure 3:
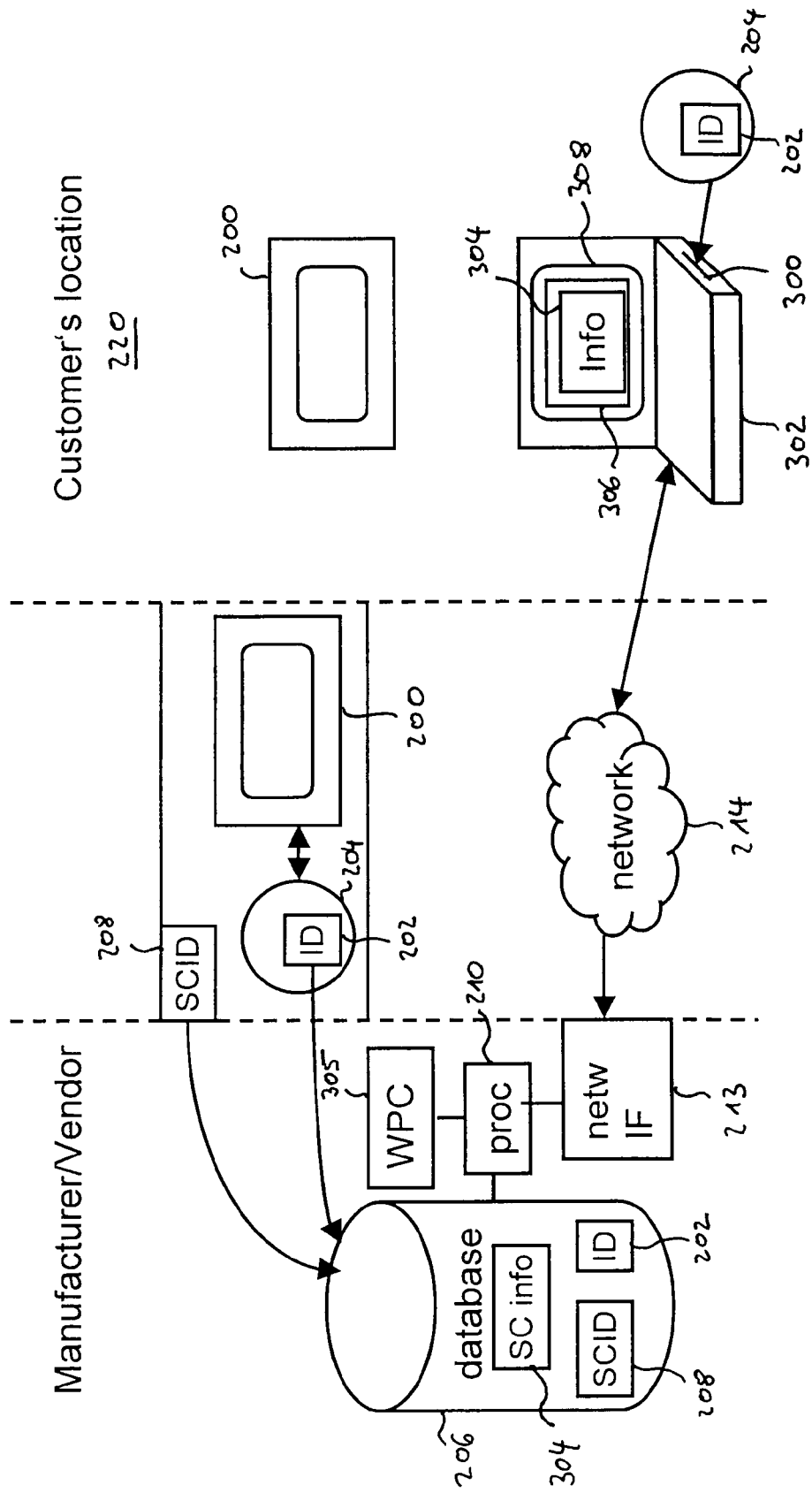
FIG. 3 shows a system according to a further embodiment of the invention.

In a further embodiment depicted in FIG. 3, the data carrier 204 is inserted into a disk drive 300 of a computer 302, which is connected to e.g. the Internet as the network 214. From the received item identifier the database can find additional sales channel information 304, e.g. advertising information from the sales channel, which has been stored in the database 206. This additional information 304 might be used by a web page creator 305 within the system, which is connected to the processor 210, to create a web page 306, which is transmitted with the help of the transmitted location identifier 222 to the computer 302 at the customer's location 220 and might be displayed as the web page 306 on a display 308 of the computer 302. So the customer can get information, e.g. about a special sale program of a retailer, where he bought the TV set 200, since this retailer has been stored as intended sales channel within the database 206.

Figure 4:
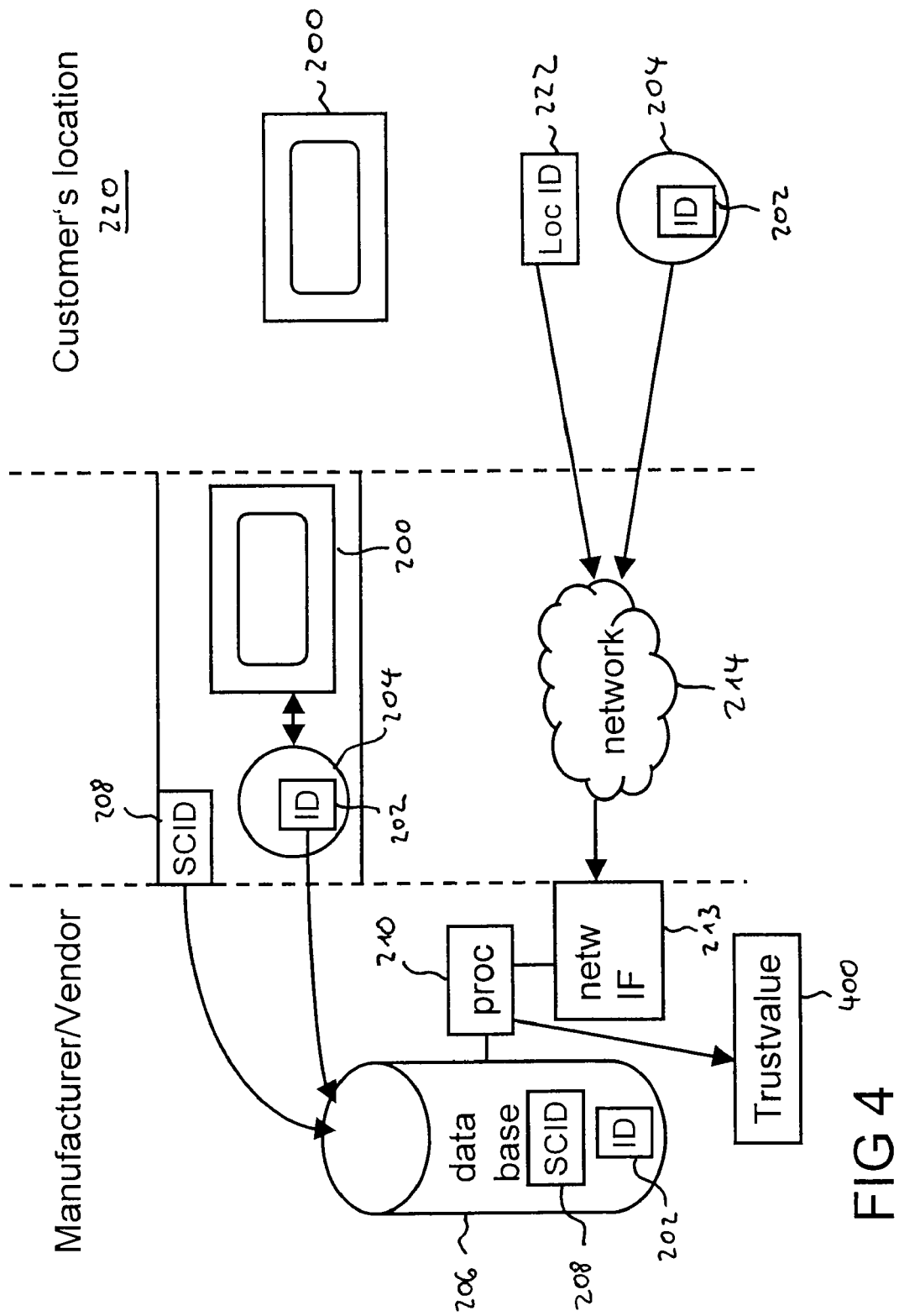
FIG. 4 shows a system according to a further embodiment of the invention.

In a further embodiment depicted in FIG. 4, the comparison between the transmitted location identifier 222 and the sales channel identifier 208 can be used by the processor 210 to determine a trust value 400, which indicates a probability, whether the merchandise item 200 has been actually sold via the intended sales channel. If the location identifier indicates a customer's location 220, which does not match to the sales channel, then the trust value would be e.g. low, whereas in case when the location identifier indicates a customer's location 220, which does match to the intended sales channel, then the trust value would be e.g. high.

A low trust value might result, e.g. if the location identifier 222 indicates a customer's location 220 in a country, in which there is no shop of the retailer, which sales channel identifier 208 has been stored in the database 206. Another possibility of a low trust value would be to find location identifiers 222 for different merchandise items 200, the location identifiers 222 indicating a large distribution area, whereas the stored sales channel identifier 208 is indicative of a sales channel with a very restricted area, e.g. for reasons of licensing contracts between the manufacturer and the actual intermediate vendor as associated sales channel.

The manufacturer to request further information from a supplier of the used sales channel might use this low trust value 400 in order to clarify the origin of such mismatches between the location identifier 222 and the sales channel identifier 208.

Figure 5:
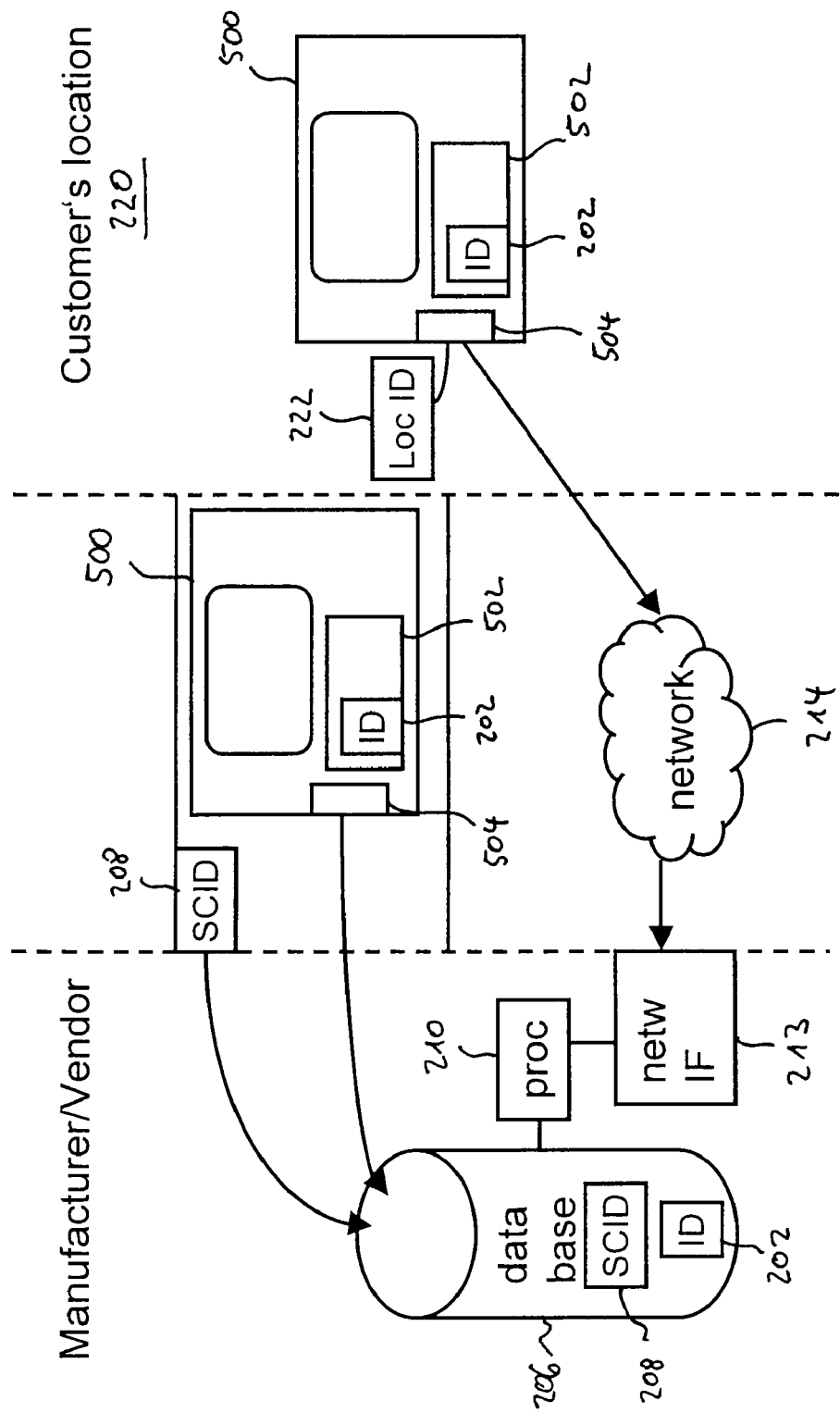
FIG. 5 shows a system according to a further embodiment of the invention with a memory in the merchandise item.

In FIG. 5 a further embodiment is depicted. A merchandise item 500 comprises a memory 502, in which the item identifier 202 is stored. Such merchandise item 500 might be TV-set with internet interface 504. The item identifier 202 is stored together with the sales channel identification in the database 206. At the customer's location 220 the TV set 500 is connected via said internet interface 504 to the network 214 and the item identifier 202 is transmitted via the network 214 to the processor 210, together with an internet address of the internet interface 504 as location identifier 222. The processor 210 is configured to compare the location identifier 222 with the associated sales channel identifier 208 of the item identifier 206.

The data carrier 204 may be used as well for registering the merchandise item 200 through the internet 214, even without knowing product details of the bought merchandise item (serial number, model code). Beside more registrations and more accurate data this procedure enables immediate, model specific response communication to the consumer, e.g. "special offers" or "offer support service for known issues", selling extended warranty, offering for sale compatible accessories or peripheral devices, promoting future or new models, or providing viral marketing environments.

The registrant (consumer) will be asked to provide contact information such as an e-mail address, an identifier for an instant messaging or social networking internet environment, cellular phone number, mailing address or the like such that information may be communicated to the registrant via these means.

In other words the following steps may be performed:
A disc with an item identifier may be produced.
An optical code (barcode) may be printed on the disc, the barcode and item identifier are put in reference.
The disc may be packed together with the merchandise item, e.g. an appliance. In this step the serial code of the device is matched with the barcode on the disc (the discs can be used for several different models of the merchandise items).

Boxes with the disc and the merchandise item may be shipped; the serial codes of the merchandise items may be registered with the used sales channel.

All data about disc, production, and distribution may be referenced for further use.

The customer may buy the merchandise item in a shop.

If the customer inserts the disc in a disk drive, the item identifier may be read automatically.

If the customer registers the disc, the web page creator may automatically fill fields "device serial code", "model type", "distributed through". These data may be retrieved through Internet connection.

Model and/or sales channel specific information may be displayed to the customer.

The invention claimed is:

1. Method for tracking a sales channel of a merchandise item, comprising:
   storing an item identifier of said merchandise item on a data carrier;
   storing in a data base said item identifier together with an associated sales channel identifier descriptive of an associated sales channel;
   selling said merchandise item together with said data carrier to a customer;
   reading at a customer's location said item identifier from said data carrier;
   transmitting said item identifier together with a location identifier identifying a location where said customer is using said sold merchandise item to said data base;
   identifying said item identifier in said data base; and
   comparing said location identifier with said associated sales channel identifier to determine if said location identifier indicates that said location where said customer is using said sold merchandise item matches an intended sales channel associated with said associated sales channel identifier.

2. Method according to claim 1, wherein said associated sales channel identifier is descriptive of the intended sales channel through which the merchandise item is intended to be sold.

3. Method according to claim 2, further comprising:
   determining a trust value, being descriptive of a probability of having actually used said intended sales channel that has been intended to be used for selling said merchandise item to said customer.

4. Method according to claim 1, wherein said step of transmitting is performed via the interne, said method further comprising:
   reading said item identifier by a data carrier read device, which is connected to the interne; and
   automatically displaying information related to said associated sales channel on a web page accessible to said customer.

5. Method according to claim 1, further comprising:
   registering said customer in said data base.

6. Method for tracking a sales channel of a merchandise item, comprising:
   storing an item identifier of said merchandise item on a data carrier;
   storing in a data base said item identifier together with an associated sales channel identifier, which is descriptive of a sales channel through which said merchandise item is intended to be sold;
   receiving said item identifier via a network;
   identifying a location identifier from a location, from which said item identifier has been transmitted;
   identifying said item identifier in said data base; and
   comparing said location identifier with said associated sales channel identifier to determine if said location identifier indicates that said location from which said identifier has been transmitted matches said sales channel through which said merchandise item is intended to be sold.

7. Method according to claim 6, further comprising:
   determining a trust value, being descriptive of a probability of having actually used said sales channel that has been intended to be used for selling said merchandise item.

8. Method for tracking a sales channel of a merchandise item, comprising:
   storing an item identifier of said merchandise item on a data carrier;
   storing in a data base said item identifier together with an associated sales channel identifier, which is descriptive of an associated sales channel;
   storing information data about said associated sales channel;
   receiving said item identifier via a network;
   identifying a location identifier from a location, from which said item identifier has been transmitted;
   identifying said item identifier in said data base;
   transmitting said information data of said associated sales channel to said location via said network; and
   comparing said location identifier with said associated sales channel identifier to determine if said location identifier indicates that said location from which said item identifier has been transmitted matches an intended sales channel associated with said associated sales channel identifier.

9. Method according to claim 8, wherein said information data is advertising data related to said associated sales channel.

10. System for tracking a sales channel of a merchandise item, comprising:
    a data base, configured to store an item identifier of said merchandise item together with an associated sales channel identifier descriptive of an associated sales channel through which said merchandise item is intended to be sold;
    a data carrier, on which said item identifier of said merchandise item is stored;
    a network interface configured to connect said data base to a network and to receive said item identifier via said network; and
    a processor connected to said network interface and to said data base, said processor being configured
      to identify a location identifier from a location where said merchandise item is used and that transmitted said item identifier,
      to identify said item identifier in said data base, and
      to compare said location identifier with said associated sales channel identifier to determine if said location identifier indicates that said location where said merchandise item is used matches said associated sales channel through which said merchandise item is intended to be sold.

11. System according to claim 10, further comprising
    a web page creator, connected to said processor, said web page creator being configured to generate a web page with information about the associated sales channel, wherein said network interface is configured to transmit said web page to said location that transmitted said item identifier.

12. System according to claim 10, wherein said processor is further configured to determine a trust value, which is descriptive of a probability of having actually used said associated sales channel that has been intended to be used for selling said merchandise item.

13. System according to claim 10, wherein said processor is configured to store said location identifier into said data base.

14. Method for tracking a sales channel of a merchandise item, comprising:

storing an item identifier of said merchandise item in a memory within said merchandise item;

storing in a data base said item identifier together with an associated sales channel identifier;

selling said merchandise item to a customer;

reading at a customer's location said item identifier from said memory;

transmitting said item identifier together with a location identifier identifying said customer's location to said data base;

identifying said item identifier in said data base; and comparing said location identifier with said associated sales channel identifier to determine if said location identifier indicates that said customer's location matches an intended sales channel associated with said associated sales channel identifier.

* * * * *